United States Patent [19]
Takarada et al.

[11] Patent Number: 4,657,951
[45] Date of Patent: Apr. 14, 1987

[54] FIBROUS MATERIAL-BASED FRICTION MEMBER

[75] Inventors: Mitsuhiro Takarada; Hiroshi Ishii; Yutaka Arai; Takashi Hamano, all of Gunma, Japan

[73] Assignees: Shin-Etsu Chemical Co, Ltd., Tokyo; Gun-ei Chemical Industry Co., Ltd., Gunma, both of Japan

[21] Appl. No.: 828,066

[22] Filed: Feb. 10, 1986

[30] Foreign Application Priority Data

Feb. 22, 1985 [JP] Japan ................................. 60-34109

[51] Int. Cl.$^4$ ............................................. C08J 5/14
[52] U.S. Cl. .................................... 523/153; 523/155; 523/156; 192/107 M
[58] Field of Search ...................... 523/153, 155, 156; 428/447; 192/107 M

[56] References Cited

U.S. PATENT DOCUMENTS

| | | | |
|---|---|---|---|
| 2,877,198 | 3/1959 | Morrissey et al. | 523/155 |
| 4,020,226 | 4/1977 | Andrianov | 192/107 M |
| 4,045,608 | 8/1977 | Todd | 428/452 |
| 4,259,397 | 3/1981 | Saito et al. | 428/288 |
| 4,262,788 | 4/1981 | Yamamoto et al. | 523/153 |

Primary Examiner—Edith Buffalow
Attorney, Agent, or Firm—Toren, McGeady and Goldberg

[57] ABSTRACT

The invention provides a friction member having high heat resistance and wearing resistance useful as a brake shoe or brake block in traffic vehicles and industrial machines. The friction member is prepared by consolidating a fibrous base material, e.g. asbestos, with a resinous binder which is a phenolic resin modified with an organopolysiloxane which characteristically comprises, in a molecule, at least one tetrafunctional siloxane unit of the formula $SiO_2$ and/or at least one trifunctional siloxane unit of the formula $R^1SiO_{1.5}$, in which $R^1$ is a substituted or unsubstituted monovalent hydrocarbon group having 1 to 8 carbon atoms.

6 Claims, No Drawings

FIBROUS MATERIAL-BASED FRICTION MEMBER

BACKGROUND OF THE INVENTION

The present invention relates to a fibrous material-based friction member used as a brake shoe or brake block in automobiles, railroad cars, industrial machines and the like or, more particularly, to a friction member formed by consolidating various kinds of fibrous materials by using a novel resinous binder.

Needless to say, friction members such as brake shoes or brake blocks are indispensable parts in all kinds of traffic vehicles, e.g. automobiles and railroad cars, and many of industrial machines for the braking purpose. These friction members are usually prepared by consolidating various kinds of fibrous materials including inorganic fibers, e.g. asbestos and ceramic fibers, and organic fibers, e.g. fibers of polyimide, polyamide and phenolic resins, by use of a resinous binder with optional addition of fillers and other additives. Performance evaluation of such a friction member is performed in terms of various physical properties at high temperatures including coefficient of friction, amount of wearing by friction, attacking behavior on the metal plate rubbed therewith and creaking as well as mechanical properties such as bending strength and flexibility.

Along with the trend in recent years toward higher and higher speed of all kinds of traffic vehicles, on the other hand, brake shoes or blocks as an application form of friction members are required to have extremely high stability in the braking effect even under severest working conditions in order to ensure safety in traffics. It is generally understood that the performance of a friction member to be evaluated from this standpoint is influenced most strongly by the resinous binder for binding and consolidating the above mentioned fibrous base material into a form.

The resinous binder used in the preparation of a friction member is, in most cases, a thermosetting resin and phenolic resins are widely used in view of their high heat resistance, excellent wearing resistance, good workability and inexpensiveness in comparison with other types of thermosetting resins. Phenolic resins currently used as a binder of friction members are mostly modified with various synthetic resins of other types with an object to obtain further improvements in respect of the above mentioned characteristics.

For example, organopolysiloxanes having a linear-chain molecular structure are proposed in Japanese Patent Kokai No. 55-92738 as a modifier of novolac-type phenolic resins which can be imparted with improved elasticity, propagation of tension and tensile strength when combined with an organopolysiloxane. Modification of a phenolic resin with a linear-chain organopolysiloxane, however, is accompanied by several problems and disadvantages including decrease in the softening point and solvent resistance of the resin and eventual appearance of slipperiness which is quite undesirable for a friction member when cracking of the organopolysiloxane takes place to produce low-molecular organopolysiloxane molecules. Thus, one of the most important technical problems to be solved in the technology of friction members is to develop a resinous binder for the fibrous base materials capable of imparting the friction member with greatly improved heat resistance and wearing resistance without being accompanied by the above mentioned disadvantages in the prior art.

SUMMARY OF THE INVENTION

An object of the present invention is therefore to provide an improved friction member prepared by consolidating a fibrous base material using a novel and unique resinous binder, by virtue of which the friction member is imparted with greatly improved heat resistance and wearing resistance without being accompanied by the disadvantages and problems in the conventional friction members in the prior art.

Thus, the present invention provides a friction member formed by binding and consolidating a fibrous base material with a resinous binder which comprises, as the principal ingredient, a phenolic resin modified with an organopolysiloxane comprising, in a molecule, at least one tetrafunctional siloxane unit expressed by the unit formula $SiO_2$ or at least one trifunctional siloxane unit represented by the general unit formula $R^1SiO_{1.5}$, in which $R^1$ is a substituted or unsubstituted monovalent hydrocarbon group having 1 to 8 carbon atoms.

DETAILED DESCRIPTION OF THE PREFERRED EMBODIMENTS

As is understood from the above given summarizing description, the most characteristic feature of the inventive friction member is in the use of a phenolic resin modified with a very specific organopolysiloxane used as a modifier of the phenolic resin. The phenolic resin as the base material for the modification with the organopolysiloxane is not particularly limitative in the type thereof and can be any one of those used as a binder in conventional friction members in a consolidated form of a fibrous base material. Usable phenolic resins include the novolao-type resins prepared by the condensation reaction of a phenolic compound and an aldehyde compound in the presence of an acidic catalyst and the resol-type resins prepared by the condensation reaction of the same reactants in the presence of an alkaline catalyst. The phenolic compound here implied includes not only phenol per se but also alkyl-substituted phenols such as cresols, tert-butyl phenols and the like.

The organopolysiloxane used for modifying the phenolic resin essentially contains, in the molecular structure thereof, at least one tetrafunctional siloxane unit of the formula $SiO_2$ and/or at least one trifunctional siloxane unit represented by the general unit formula $R^1SiO_{1.5}$, in which $R^1$ is a substituted or unsubstituted monovalent hydrocarbon group having 1 to 8 carbon atoms exemplified by alkyl groups, e.g. methyl, ethyl, propyl and butyl groups, alkenyl groups, e.g. vinyl and allyl groups, and aryl groups, e.g. phenyl and tolyl groups, as well as those substituted groups obtained by replacing a part or all of the hydrogen atoms in the above named hydrocarbon groups with substituent atoms or groups such as halogen atoms, cyano groups and the like exemplified by chloromethyl, 3,3,3-trifluoropropyl and cyanomethyl groups.

It is of course that these tetra- and/or trifunctional siloxane units may be combined with mono- and/or difunctional siloxane units so that the organopolysiloxane is expressed by the overall unit formula $(R^1SiO_{1.5})_a(SiO_2)_b(R^2_3SiO_{0.5})_c(R^3_2SiO)_d$, in which $R^2$ and $R^3$ are each a monovalent hydrocarbon group selected from the same classes of the groups given above as the examples of the group denoted by $R^1$ and the subsripts a, b, c and d are each zero or a positive number with the proviso that a and b cannot be simultaneously equal to zero. It is preferable that these subscripts satisfy the relationship that the ratio a/(a+b+c+d) is in the range from 0.1 to 1.0. In other words, at least 10% by moles of the siloxane units in a molecule should preferably be trifunctional organosiloxane units.

As is mentioned below, the modification reaction of the phenolic resin with the organopolysiloxane proceeds according to the mechanism of dehydration condensation or dealcoholation condensation therebetween so that the organopolysiloxane should contain hydroxy and/or alkoxy groups bonded to the silicon atoms in an amount in the range, for example, from 0.1 to 50% by weight. It is also preferable taht a substantial portion of the monovalent hydrocarbon groups in the organopolysiloxane should be phenyl groups from the standpoint of obtaining better compatibility of the organopolysiloxane with the phenolic resin.

The method for the preparation of the organopolysiloxane is well known in the art of silicones. For example, various kinds of organosilane compounds having at least one hydrolyzable group in a molecule are either singly or as a mixture of two kinds or more subjected to (co)hydrolysis and (co)condensation reaction to form siloxane linkages. Exemplary of the organosilane compounds are methyl trichlorosilane, dimethyl dichlorosilane, trimethyl chlorosilane, silicon tetrachloride, phenyl trichlorosilane, diphenyl dichlorosilane, dimethyl dimethoxy silane, methyl trimethoxy silane, diphenyl dimethoxy silane, phenyl trimethoxy silane, phenyl methyl dichlorosilane and the like. The resultant organopolysiloxanes are expressed, for example, by the following structural formulas, in which the symbols Me and Ph each denote a methyl and a phenyl group, respectively: PhSi[—O—Si(Me)(Ph)(OMe)]$_3$; MeSi[—O—Si(Me)(Ph)(OMe)]$_3$; and (MeO)$_2$(Ph)Si—O—SiPh$_2$—O—SiMe$_2$—OMe.

Further, the organopolysiloxanes may be expressed by the following unit formulas containing hydroxy and/or alkoxy group in an amount of 0.1 to 10% by weight:

(MeSiO$_{1.5}$)$_{25}$(Ph$_2$SiO)$_{40}$(Me$_2$SiO)$_{35}$;
(PhSiO$_{1.5}$)$_{30}$(Ph$_2$SiO)$_{30}$(Me$_2$SiO)$_{40}$; and
(PhSiO$_{1.5}$)$_{15}$(MeSiO$_{1.5}$)$_{10}$(Ph$_2$SiO)$_{40}$(Me$_2$SiO)$_{35}$.

The resinous binder used in the preparation of the inventive friction member is obtained by modifying a phenolic resin with the above described organopolysiloxane. The modification reaction proceeds by the dehydration condensation and/or dealcoholation condensation therebetween and can readily be performed by heating a mixture of the reactants at a temperature of 100° to 170° C. in a solvent such as toluene, xylene, methyl ethyl ketone, methyl isobutyl ketone, cyclohexanone, ethylene glycol monoethyl ether acetate, ethylene glycol monomethyl ether, ethylene glycol monoethyl ether, N-methyl-2-pyrrolidone, dimethyl formamide and the like or a mixture thereof in the presence of a catalyst for transesterification reaction.

The amount of the organopolysiloxane used in the above mentioned modification reaction of the phenolic resin should usually be in the range from 10 to 150 parts by weight or, preferably, from 20 to 100 parts by weight per 100 parts by weight of the phenolic resin. When the amount of the organopolysiloxane is too small, the desired effect of modification cannot be obtained as a matter of course so that the friction member prepared by use of such a phenolic resin is hardly improved in respect of the heat resistance and wearing resistance. When the amount of the organopolysiloxane is too large, on the other hand, the crosslinking density of the modified resin is so high that the modification reaction can be performed only at a risk of eventual gelation of the mixture under the reaction.

Exemplary of the catalyst for the transesterification used in the modification reaction are tetrabutyl titanate, tatra(isopropyl) titanate, butyl polytitanate, trichloroacetic acid, benzene sulfonic acid, p-toluene sulfonic acid, chelate compounds of aluminum and the like. The amount of the catalyst added to the reaction mixture should be in the range from 0.01 to 0.5 part by weight per 100 parts by weight of the organopolysiloxane. When the amount of the catalyst is too large, the reaction mixture may eventually become gelled in the course of the modification reaction. The modification reaction is usually complete within 4 to 16 hours and should be terminated by monitoring the distillation rate of the water and/or alcohol produced by the condensation reaction. After completion of the reaction, the reaction mixture is freed from the organic solvent used as the diluent by distillation under reduced pressure to leave the desired phenolic resin modified by the organopolysiloxane.

The above described organopolysiloxane-modified phenolic resin is useful as a binder for consolidating various kinds of inorganic and organic fibrous materials, e.g. asbestos and fibers of a phenolic resin, into a form of brake shoes or blocks with admixture of other optional additives such as inorganic and organic fillers, e.g. barium sulfate, calcium carbonate, cashew dust and rubber dust, powders of metals, e.g. copper and aluminum, coupling agents and others. A typical formulation of the blend for shaping the inventive friction member comprises: 100 parts by weight of a fibrous base material; from 10 to 35 parts by weight of the resinous binder composed of the organopolysiloxane-modified phenolic resin as described above and a crosslinking agent therefor; from 40 to 60 parts by weight of the filler; and from 4 to 6 parts by weight of other additives including metal powders and coupling agents. The above mentioned crosslinking agent is an agent to cure the phenolic resin capable of emitting formaldehyde by heating such as hexamethylene tetramine, paraformaldehyde and the like. The amount of the crosslinking agent should preferably be in the range from 5 to 20 parts by weight per 100 parts by weight of the organopolysiloxane-modified phenolic resin since a smaller amount than above may result in insufficient cure of the resin while an excessively large amount is disadvantageous due to the blistering of the shaped articles and pollution of the working environment as a result of the increased volume of gas evolution. The inventive friction member is prepared by filling a metal mold with the uniform blend of the above described formulation and subjecting the blend to compression molding at a temperature in the range from 150° to 200° C. under a pressure in the range from 100 to 300 kgf/cm$^2$. In this manner, friction members having greatly improved heat resistance and wearing resistance can be produced with reliability and inexpensiveness to give a great industrial advantage.

In the following, examples and comparative examples are given to illustrate the friction member of the invention in more detail. In the following description, the expression of "parts" always refers to "parts by weight". The wearing resistance was calculated from the results obtained by the measurements undertaken on a fixed-speed friction tester according to JIS D 4411.

EXAMPLES 1 TO 3 AND COMPARATIVE EXAMPLES 1 AND 2

I. Preparation of the resinous binders (Preparation 1)

A uniform reaction mixture was formed in a reaction vessel by dissolving 1430 parts of a novolac-type phenol-formaldehyde resin in a solvent mixture of 600 parts of ethylene glycol monoethyl ether acetate and 300 parts of xylene under agitation and then admixed with 620 parts of a methyl phenyl polysiloxane expressed by the unit formula $(PhSiO_{1.5})_{25}(Ph_2SiO)_{25}(Me_2SiO)_{50}$ having an average molecular weight of about 5000 and containing 5% by weight of hydroxy groups together with 0.6 part of tetrabutyl titanate. The mixture was heated under agitation at 150° C. for 10 hours to effect the dehydration condensation reaction and then freed from the solvents by distillation at 120° C. under a reduced pressure of 10 mmHg to leave 2030 parts of a clear, brown resinous material which was solid by cooling. A powdery resin composition, referred to as Resin A hereinbelow, was prepared by pulverizing the thus obtained solid resin together with hexamethylene tetramine in an amount of 10% by weight based on the resin.

(Preparation 2)

A uniform reaction mixture was formed in a reaction vessel by dissolving 900 parts of a novolac-type phenol-formaldehyde resin in a slovent mixture of 400 parts of ethylene glycol monoethyl ether acetate and 100 parts of xylene under agitation and then admixed with 390 parts of a methyl phenyl methoxy polysiloxane expressed by the structural formula $PhSi[-O-Si(-Me)(Ph)(OMe)]_3$ together with 0.3 part of tetrabutyl titanate. The mixture was heated under agitation at 130° C. for 6 hours to effect the demethanolation condesation reaction and then freed from the solvents by distillation at 120° C. under a reduced pressure of 10 mmHg to leave 1260 parts of a clear, brown resinous material which was solid by cooling. A powdery resin composition, referred to as Resin B hereinbelow, was prepared by pulverizing the thus obtained solid resin together with hexamethylene tetramine in an amount of 10 % by weight based on the resin.

(Preparation 3)

A uniform reaction mixture was formed in a reaction vessel by dissolving 500 parts of a resol-type phenol-formaldehyde resin and 400 parts of a novolac-type phenol-formaldehyde resin in a solvent mixture of 200 parts of xylene and 200 parts of methyl isobutyl ketone under agitation and then admixed with 390 parts of the same methyl phenyl methoxy polysiloxane as used in the preparation of the Resin B together with 0.3 part of tetrabutyl titanate. The mixture was heated under agitation at 140° C. for 6 hours to effect the demethanolation condensation reaction and then freed from the solvents by distillation at 120° C. under a reduced pressure of 20 mmHg to leave 1270 parts of a clear, brown resinous material which was solid by cooling. A powdery resin composition, referred to as Resin C hereinbelow, was prepared by pulverizing the thus obtained solid resin together with hexamethylene tetramine in an amount of 10% by weight based on the resin.

(Preparation 4)

A uniform reaction mixture was formed in a reaction vessel by dissolving 500 parts of a novolac-type phenol-formaldehyde resin in a solvent mixture of 200 parts of xylene and 100 parts of methyl isobutyl ketone under agitation and then admixed with 150 parts of a dimethylpolysiloxane having a linear molecular structure and expressed by the structural formula $MeO-(-SiMe_2-O)_{20}Me$ together with 0.2 part of tetrabutyl titanate. The mixture was heated under agitation at 140° C. for 4 hours to effect the demethanolation condensation reaction and then freed from the solvents by distillation at 120° C. under a reduced pressure of 20 mmHg to leave 640 parts of a brown resinous material with turbidity which was solid by cooling. A powdery resin composition, referred to as Resin D hereinbelow, was prepared by pulverizing the thus obtained solid resin together with hexamethylene tetramine in an amount of 10% by weight based on the resin.

II. Preparation and evaluation of the friction members

Five fibrous molding compounds A, B, C, D and E were prepared each uniformly blending 50 parts of asbestos, 10 parts of fibers of a phenolic resin (Kainol, a product by Gun-ei Chemical Co.), 10 parts of barium sulfate, 12 parts of cashew dust, 3 parts of rubber dust and 3 parts of a copper powder together with 12 parts of one of the Resins A to D for the compounds A to D, respectively, or Resin E, which was a powdery blend of an unmodified novolac-type phenol-formaldehyde resin and hexamethylene tetramine in a weight proportion of 100:10, for the compound E.

Each of the molding compounds A to E was shaped by compression molding in a metal mold at 170° C. under a pressure of 200 kgf/cm² into a form which was then subjected to a treatment of post-baking at 180° C. for 4 hours to give a shaped body having a density in the range from 1.75 to 1.78 g/cm³. The thus prepared shaped bodies were each subjected to the determination of the coefficient of friction and the rate of wearing to give the results shown in Table 1 below. As is clear form these results, the shaped bodies of the molding compounds D and E (Comparative Examples 1 and 2) were not free from the undesirable phenomenon of fading, i.e. rapid decrease of the coefficient of friction at high temperatures, while those of the molding compounds A to C (Examples 1 to 3) were free from such an undesirable phenomenon with a stable coefficient of friction in the range from 0.35 to 0.40 over the whole range of the temperature for the determination. Furthermore, the rate of wearing in Examples 1 to 3 was much smaller than in Comparative Examples, in particular, at high temperatures to support the conclusion that the inventive friction members are excellent as a brake shoe or brake block.

TABLE 1

| Item | Temperature, °C. | Molding compound | | | | |
|---|---|---|---|---|---|---|
| | | A | B | C | D(*) | E(*) |
| Coefficient of friction | 100 | 0.38 | 0.36 | 0.38 | 0.28 | 0.36 |
| | 150 | 0.37 | 0.38 | 0.37 | 0.28 | 0.37 |
| | 200 | 0.37 | 0.40 | 0.37 | 0.30 | 0.40 |
| | 250 | 0.40 | 0.38 | 0.40 | 0.31 | 0.37 |
| | 300 | 0.37 | 0.38 | 0.40 | 0.25 | 0.31 |
| | 350 | 0.35 | 0.36 | 0.37 | 0.22 | 0.28 |
| Rate of wearing, $10^{-7}$ cm³/kgf · m | 100 | 0.75 | 0.95 | 0.90 | 0.87 | 0.90 |
| | 150 | 0.80 | 1.03 | 1.32 | 1.22 | 1.55 |
| | 200 | 1.35 | 1.15 | 2.20 | 2.00 | 2.10 |
| | 250 | 2.11 | 1.85 | 3.50 | 2.80 | 4.36 |
| | 300 | 3.30 | 3.25 | 5.10 | 5.30 | 8.62 |

TABLE 1-continued

| Item | Temperature, °C | Molding compound | | | | |
|---|---|---|---|---|---|---|
| | | A | B | C | D(*) | E(*) |
| | 350 | 5.85 | 6.30 | 7.21 | 8.50 | 15.4 |

*Comparative Example

What is claimed is:

1. A friction member formed by consolidating a fibrous base material with a resinous binder which comprises a phenolic resin modified with an organopolysiloxane comprising, in a molecule, at least one tetrafunctional siloxane unit expressed by the unit formula $SiO_2$ or at least one trifunctional siloxane unit represented by the general unit formula $R^1SiO_{1.5}$, in which $R^1$ is a substituted or unsubstituted monovalent hydrocarbon group having 1 to 8 carbon atoms.

2. The friction member as claimed in claim 1 wherein the phenolic resin is modified with the organopolysiloxane in an amount in the range from 10 to 150 parts by weight per 100 parts by weight of the unmodified phenolic resin.

3. The friction member as claimed in claim 1 wherein the organopolysiloxane is represented by the general unit formula $(R^1SiO_{1.5})_a(SiO_2)_b(R^2{}_3SiO_{0.5})_c(R^3{}_2SiO)_d$, in which $R^1$, $R^2$ and $R^3$ are each a substituted or unsubstituted monovalent hydrocarbon group having 1 to 8 carbon atoms and the subscripts a, b, c and d are each zero or a positive number with the proviso that a and b are not simultaneously equal to zero and the ratio of $a/(a+b+c+d)$ is in the range from 0.1 to 1.0.

4. The friction member as claimed in claim 3 wherein the organopolysiloxane contains from 0.1 to 50% by weight of functional groups selected from the class consisting of hydroxy groups and alkoxy groups.

5. The friction member as claimed in claim 1 wherein the amount of the resinous binder is in the range from 10 to 35 parts by weight per 100 parts by weight of the fibrous base material.

6. The friction member as claimed in claim 5 wherein the resinous binder oomprises 100 parts by weight of a phenolic resin modified with the organopolysiloxane and from 5 to 20 parts by weight of a crosslinking agent for the phenolic resin capable of emitting formaldehyde.

* * * * *